Nov. 8, 1949 C. E. FITCH 2,487,230
SHAFT SEAL
Filed Aug. 18, 1945
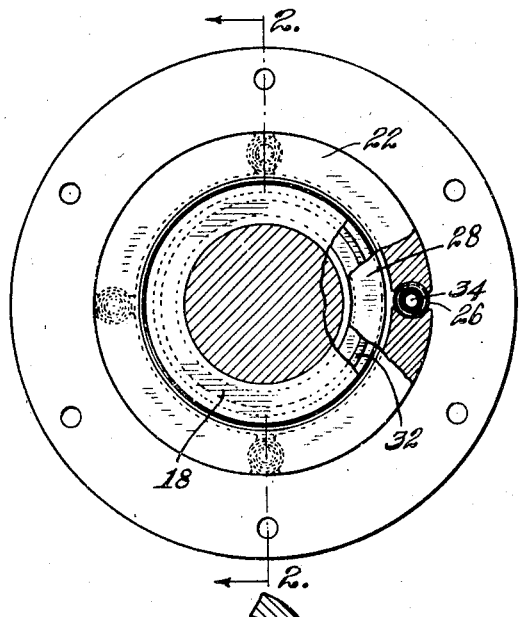
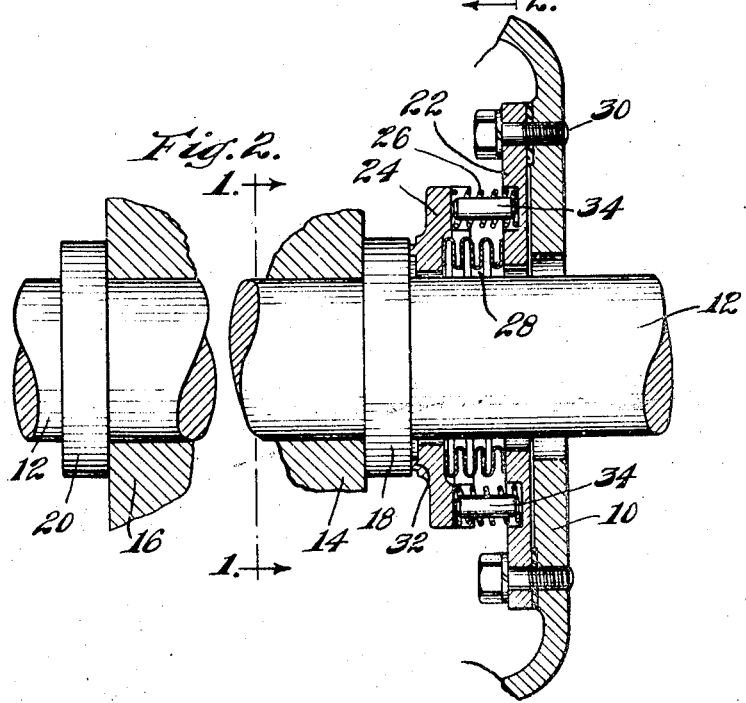
INVENTOR.
Clifford E. Fitch.
BY Bair & Freeman
ATTORNEYS.

Patented Nov. 8, 1949

2,487,230

UNITED STATES PATENT OFFICE 2,487,230

SHAFT SEAL

Clifford E. Fitch, Bryan, Ohio, assignor to The Aro Equipment Corporation, Bryan, Ohio, a corporation of Ohio Application August 18, 1945, Serial No. 611,334

1 Claim. (Cl. 286—11)

My present invention relates to a shaft seal of the diaphragm or bellows type, having means to prevent failure of the bellows or diaphragm as a result of vibrations set up in the seal.

One object of the invention is to provide a limiting means for limiting vibrations set up in a sealing ring of a shaft seal, so that immediately upon commencement of any vibrations they are damped out and are prevented thereby from becoming amplified and causing fatigue of the bellows or diaphragm with eventual breakage thereof.

Another object is to provide damping means for a sealing ring of a shaft seal in the form of limiting thrust elements, such as pins or the like, which may conveniently be placed within the coils of a plurality of sealing ring springs, the length of the pins being slightly shorter than the distance between the sealing ring and a housing, so that vibrations of even slight amplitude are quickly and effectively damped out.

With these and other objects in view, my invention consists in the construction, arrangement and combination of the various parts of my shaft seal, whereby the objects contemplated are attained, as hereinafter more fully set forth, pointed out in my claim, and illustrated in the accompanying drawings, in which:

Figure 1 is an inside elevation of a shaft seal embodying my invention; and

Figure 2 is a sectional view on the line 2—2 of Figure 1—Figure 1 being taken as on the line 1—1 of Figure 2.

On the accompanying drawing, I have used the reference numeral 10 to indicate a housing of a liquid pump, refrigerant compressor, air compressor or the like, my invention being applicable to any machine of the type wherein there is a housing from which a rotating shaft projects, and where it is desirable to have a shaft seal between the shaft and the housing.

The shaft is shown at 12 and it may be suitably journaled in bearings, such as 14 and 16, mounted in the housing 10, the bearings being of any desired type and forming no part of my present invention. The shaft 12 while being rotatable in the bearings 14 and 16 is limited against endwise movement as by enlargements 18 and 20 adjacent the bearings 14 and 16.

Shaft seals are known, the type shown being one in which there is a flange 22, a sealing ring 24, a plurality of springs 26 interposed between the two, and a bellows or diaphragm 28. The flange 22 may be secured to the housing 10 as by cap screws 30, with a suitable gasket interposed between the two. The sealing ring 24 has an annular projection 32 adapted to contact a shoulder formed by one of the planar faces of the enlargement 18, the springs 26 biasing the annular projection 32 against the shoulder of the enlargement 18, and the bellows 28 flexing to permit of such movement, yet providing a seal against pressure exchange between the inside and the outside of the housing 10. The right-hand end of the bellows 28 is soldered to the flange 22, while the left-hand end is soldered to the sealing ring 24.

Shaft seals of the kind just described have proven satisfactory in connection with shafts which rotate at slow speed, such as those up to 700 or 800 R. P. M. In many machines a higher shaft speed is required. I have found that these higher speeds result in failure of the diaphragm or bellows within a very short period of time, due chiefly to lack of lubrication of the sealing ring 24. The pressure of the springs 26 tends to squeeze out any oil between these two surfaces, and particularly at high speed, this results in a chattering-like vibration—the vibrations gaining amplitude after they commence with the springs 26 aggravating the vibratory condition. This results in rapid flexing of the bellows 28 and fracture thereof within a few seconds' time. This has caused considerable difficulty in the production, particularly of fuel pumps for airplanes.

After several failures of this nature, I devised a means for damping the vibrations before they gained any considerable amount of amplitude, which may be simply done by inserting pins 34 in the springs 26. The pins are slightly less in length than the clearance between the sealing ring 24 and the flange 22, so that in no case do both ends of the pins contact with the two during normal operation. That is to say, the shaft 12 is limited in its movement toward the right and that limit of movement places the surfaces of the sealing ring 24 and of the flange 22 a predetermined distance apart. The pins 34 are then slightly less than this distance—for instance one sixty-fourth of an inch.

By placing the pins 34 in the springs 26 as just described, I found that any vibrations that commence are immediately damped out and all failures of the bellows 28 were thereafter eliminated.

Some shaft seals are provided with a diaphragm instead of a bellows, and where these diaphragms are subject to failure due to rapid flexing caused by vibrations, the structure may there be improved by the use of pins 34 in the manner described.

While I have shown the pins as located within the springs, obviously they may assume other locations and may be in the form of thrust elements other than pins, the prime consideration being that any vibration of the sealing ring 24 be immediately damped out because of the available play being taken up as soon as there is any bouncing of the annular projection 32 away from the shoulder of the enlargement 18.

In the following claim, it is to be understood that the term "bellows" applies also to a diaphram, the two being mechanical equivalents.

Some changes may be made in the arrangement and construction of the various parts of my shaft seal, without departing from the real spirit and purpose of my invention, and it is my intention to cover by my claim, any modified forms of structure or use of mechanical equivalents, which may be reasonably included within its scope.

I claim as my invention:

In a shaft seal of the character disclosed, a housing, a shaft rotatable in said housing and limited as to end movement relative thereto, a shaft seal comprising a shoulder on said shaft, a sealing ring against said shoulder, a plurality of springs biasing said sealing ring against said shoulder, a bellows sealing said sealing ring to said housing, and a pin in each of said springs to limit the movement of said sealing ring toward said housing, said pins being not more than $1/64$ of an inch less in length than the spacing between the sealing ring and the housing.

CLIFFORD E. FITCH.

REFERENCES CITED

The following references are of record in the file of this patent:

UNITED STATES PATENTS

| Number | Name | Date |
| --- | --- | --- |
| 1,770,273 | Keema | July 8, 1930 |
| 1,822,052 | Maccabee | Sept. 8, 1931 |
| 1,860,981 | Bihl | May 31, 1932 |
| 1,897,937 | Joyce | Feb. 14, 1933 |
| 1,956,366 | Vedovell | Apr. 24, 1934 |
| 2,277,771 | McNab | Mar. 31, 1942 |
| 2,301,723 | Vedovell | Nov. 10, 1943 |